United States Patent
Schmedes et al.

[11] 3,778,156
[45] Dec. 11, 1973

[54] HEATED SAMPLE CELL

[75] Inventors: Helga Schmedes; Paul Hansen, both of Überlingen; Bernhard Welz, Merrsburg, all of Germany

[73] Assignee: Bodenseewerk Perkin-Elmer Co., GmbH, Überlingen/Bodensee, Germany

[22] Filed: Sept. 28, 1972

[21] Appl. No.: 292,891

[30] Foreign Application Priority Data
Sept. 30, 1971 Germany................... P 21 48 743.2

[52] U.S. Cl.................................. 356/244, 356/85
[51] Int. Cl............................................... G01j 3/30
[58] Field of Search..................... 356/244, 246, 85; 250/49.5

[56] References Cited
UNITED STATES PATENTS
3,671,129   6/1972   Wiedeking............................ 356/85
3,702,219   11/1972   Braun et al.......................... 356/85

*Primary Examiner*—William L. Sikes
*Attorney*—Daniel R. Levinson

[57] ABSTRACT

A known type of heated sample cell assembly for atomic absorption spectroscopy includes an open-ended graphite sample tube having a central hole for initially introducing the sample into the tube and for allowing an inert protective gas to circulate from the otherwise closed surrounding housing into the tube to protect the interior surfaces from oxidization when the device is heated, as by large electrical currents supplied from electrodes in contact with both ends of the graphite tube. A known improvement includes the addition of holes near the ends of the graphite tube to reduce the speed at which a given total protective gas flow causes the sample to be expelled from the open end of the tube, thereby increasing useful measuring time. The present change includes providing bores through the electrodes so that the inert protective gas flows into the area immediately adjacent the open ends of the graphite sample tube. This technique of supplying additional protective gas tends to exclude air from reaching any part of the graphite tube, without causing eddy currents at the tube or complicating manufacturing of the tube by requiring carefully made additional holes in the graphite tube.

7 Claims, 2 Drawing Figures

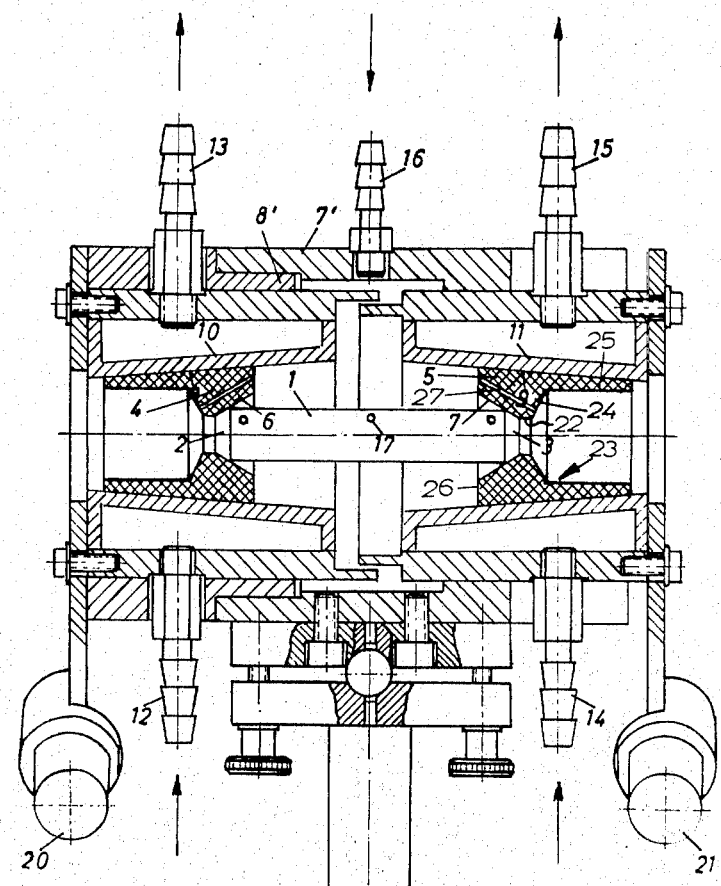
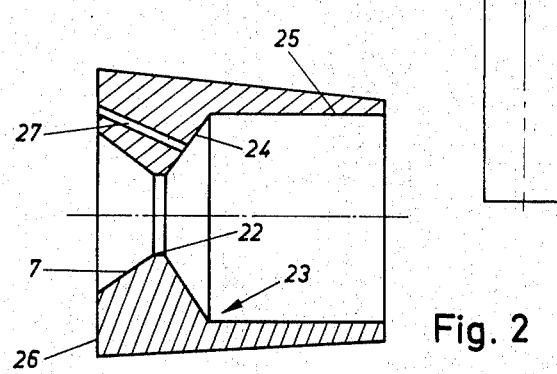
Fig. 1
Fig. 2

HEATED SAMPLE CELL

This invention relates to a heated cell for vaporizing samples in atomic absorption spectrometers, comprising a graphite tube which is mounted in a housing between two electrodes for supplying a large heating current and which has a hole in the generated (i.e., tubular) surface in its central area, the whole apparatus further comprising a connection for introduction of an inert protective gas, and in which further holes are provided for introduction of the protective gas into the area adjacent the ends of the graphite tube.

A heated graphite tube sample cell of the type indicated has been proposed (German published Patent application No. 2,006,032, corresponding to U. S. Patent application Ser. No. 112,855, filed Feb. 5, 1971) in which the graphite tube has the further holes near the ends of the graphite tube. The protective gas circulates around the graphite tube on the outside and enters into the interior of the graphite tube through the hole in the central area so that the graphite tube is surrounded by circulation of the protective gas from all sides and any admission of fresh air cannot take place. The protective gas flows off through the open ends of the graphite tube. In order to prevent a too rapid rinsing of the sample vapor out of the graphite tube by the protective gas stream and an undesired reduction in the available measuring time caused thereby, the additional holes are provided near the ends of the graphite tube. In this manner it is no longer the total protective gas stream which must prevent penetration of fresh air into the interior of the graphite tube, that is passed through the central hole of the graphite tube from where it flows through the interior of the graphite tube towards the ends thereof and leaves there, but rather in addition a flow parallel to it is produced which passes along the outside of the graphite tube and enters the tube through the additional holes.

Since when using radial bores for the additional holes if they have large diameters undesired turbulences may occur which, perhaps could lead to fresh air admission and burning-off indications (i.e., burning at hot spots), it has been proposed by the German published Patent application No. 2,006,032 to provide the additional holes as secantial or almost tangential bores. Then, a cyclonic flow occurs which adheres to the inside wall of the graphite tube and has an improved stability with respect to draft.

Another possibility would be to make the bores constituting the additional holes so small in diameter that the flow passing therethrough does not appreciably disturb the laminar flow in the graphite tube. But then it would be necessary to provide a greater number of such narrow bores in order to pass the necessary protective gas volume onto the end areas of the graphite tube, by-passing the central portions of the graphite tube interior to achieve sufficient protection against fresh air admission. This, however, represents a considerable complication in the manufacture of the graphite tube.

The graphite tube substantially represents a consumable material which is used up after 100 to 200 measurements and must be replaced by a new graphite tube. According to the German published Patent application No. 2,006,032, in each such graphite tube many narrow bores or further holes bored tangentially or secantially must be provided. This means a considerable complexity in the manufacture so that the consumable material "graphite tube" becomes expensive because of it, and thereby the cost of each individual measurement is also increased.

It is an object of this invention to so devise a heated sample cell assembly having a graphite tube cell of the type indicated hereinbefore that on the one hand admission of fresh air to the heated graphite tube is positively precluded, while on the other hand the cost of each individual measurement can be kept lower than the cell with respect to the German published Patent application No. 2,006,032.

It is another object of this invention to improve the working life of graphite tubes in graphite tube sample cells and to simplify their manufacture.

According to the invention this is attained by providing that the additional holes are made in the electrodes.

Thus, no further holes need be provided at the ends of each graphite tube. These holes are rather provided in the electrodes which have a considerably longer working life, for instance, of some thousand measurements. Therewith, the complexity in the manufacture of the graphite tubes themselves representing a consumable material is reduced and with it, in turn, the cost of an individual measurement is lowered. Bores in the area of the hot graphite tube end and the eddies caused there upon introduction of protective gas lead to burning-off (i.e., oxidized hot spots). If the same eddies are caused in the substantially cooler electrode, no burning-off is observed either there or on the graphite tubes. Therefore, greater diameter and possibly also radial holes can be bored, without leading to the otherwise observed detrimental effects.

In general it has been shown that also with the additional holes in the electrodes (instead of in the graphite tube) an unobjectionable protection of the graphite tube against fresh air admission can be attained.

In a graphite tube sample cell in which the graphite tube is designed conically at its ends and is mounted between complementary conical surfaces of annularly designed electrodes arranged coaxially with the graphite tube, and in which the electrodes on the side remote from the graphite tube and following the side conical surfaces have inner surfaces expanding again from a most restricted cross-section, the said further holes can advantageously be constituted by bores which extend from front faces of the electrodes on the side facing the center of the graphite tube and terminate in the said expanding inner surfaces near the ends of the graphite tube. The front faces of the electrodes on the side nearer the center of the graphite tube are expediently annular surfaces perpendicular to the axis of the electrodes (and the longitudinal axis of the graphite tube) which immediately follow the said conical surfaces and extend radially from the inner ends thereof.

A particularly advantageous form of the electrodes is obtained if the expanding inner surfaces of the electrodes (at their parts extending away from the ends of the graphite tube) have a respective conical portion following the most restricted cross-section and a respective cylindrical portion following the conical portion. Preferably the taper angle of the conical portion of said expanding inner surface is greater than the taper angle of the conical surface accommodating the end of the graphite tube. The said bores can terminate in the conical portion of the expanding inner surface of the electrodes. The external generated surfaces of the electrodes can be designed slightly tapering outwardly.

With this form of electrode a favorable flow pattern is obtained such that any admission of fresh air to the heated graphite tube is prevented by the protective gas streams.

On the other hand, an electrode is obtained whose mass is smaller than when compared with the electrodes in prior art graphite tube cells. Hence, the electrode is heated up more strongly by the current whereby the heat flowoff at the graphite tube end and the adsorption of volatile samples at the electrode are reduced. Moreover, the new form of the electrode facilitates boring the holes for the protective gas stream by-passing the graphite tube.

An illustrative embodiment of this invention will now be described more fully with reference to the accompanying drawing in which FIG. 1 is a longitudinal section through a heated sample cell including a graphite tube according to the invention.

FIG. 2 illustrates an electrode, on an enlarged scale, in the graphite tube sample cell according to FIG. 1.

A graphite tube 1 is designed so that its ends are tapering as at 2 and 3. By means of these conical ends 2 and 3 the graphite tube 1 is mounted in two electrodes 4 and 5 which are provided with complementary conical surfaces 6 and 7. The electrodes 4 and 5 are also made of graphite. They have annular (i.e., ring-shaped) configuration and are arranged coaxially with the graphite tube 1. The outer surfaces 8 and 9 of the electrodes also are designed slightly tapering so that the external diameter of the electrodes at their ends remote from the graphite tube 1 are smaller than in the area at the graphite tube.

The electrodes 4, 5 are surrounded by cooling jackets 10, 11 which have complementary slightly conical inner surfaces. Thus, the electrodes are self-adhering in the cooling jackets 10, 11 so that the electric and thermal transfer resistance between the electrodes 4, 5 and the cooling jackets 10 and 11 are kept small. The cooling jackets extend in an axial direction inwardly beyond the electrodes 4 and 5 so that the graphite tube 1 is surrounded by the cooling jackets 10, 11 substantially from all sides. The cooling jackets 10, 11 are mounted in one housing part each 8' and 7'.

Through a connection 16 protective gas is supplied. This protective gas flows through an opening 17 in the central area of the graphite tube 1 into the interior of the graphite tube.

The electrodes 4, 5 are annular and arranged coaxially with the graphite tube 1. The conical surfaces 6 and 7 (facing inwardly toward tube 1) are followed outwardly by the most restricted (i.e., narrowest) cross-section 22 and a generally expanding inner surface 23. This expanding inner surface 23 includes a conical portion 24 and a cylindrical portion 25 extending outwardly therefrom. On the side toward the center of the graphite tube, the conical surface 7 is followed by a front face 26 which constitutes an annular surface perpendicular to the axis of the graphite tube and of the electrode.

The dimensioning of the angle which can be seen in FIG. 2 has proven to be advantageous. Accordingly, the taper angle of the conical surface 7 is about 60° and the taper angle of the conical portion 24 of the expanding inner surface 23 is greater than the former taper angle, namely 114°. Bores 27 extend from the front face 26 to the conical portion 24. Through these bores protective gas is blown from the interior of the housing into the space within the electrodes 4, 5 in front of the openings of the graphite tube 1. Thereby, the admission of fresh air to the graphite tube 1 and to the electrodes 4, 5 is prevented; and the electrodes and the graphite tube are protected against burning in this manner when a high current is applied to the electrodes 4, 5 and the graphite tube 1 (through high-current plug connections 20, 21) and the graphite tube is heated thereby up to a high temperature.

A sample can be introduced into the graphite tube 1 through the opening 17. When the graphite tube 1 is heated up and may assume a temperature of the order of 2,000°C, a dissociation of the sample compounds into their atoms takes place. The extinction (i.e., absorbance) is measured in the conventional manner at a resonant wavelength of a wanted element (i.e., the element desired to be measured). Because the protective gas stream not only flows through the central opening 17, but a stream parallel to it flows through the openings 27 in the electrodes towards the ends of the tube 1, the atomized sample vapor in the interior of the tube is rinsed out less strongly by the protective gas. Therefore, for a given sample volume longer measuring times can be achieved than with prior art graphite tube cells which only have one central opening corresponding to the opening 17.

The electrodes 4, 5 are advantageously also made of graphite.

What is claimed is:

1. In a heated sample cell assembly for atomic absorption spectrometers of the type including: a graphite sample tube mounted in a housing between two electrodes for supplying a large heating current, said tube having a hole in its tubular surface in a central area, and said housing further comprising a connection for introduction of the protective gas, in which further holes are provided for introduction of protective gas into the area of the ends of the graphite tube, the improvement comprising: said further holes comprise bores (27) extending through said electrodes (4,5).

2. A heated sample cell assembly as claimed in claim 1, in which the graphite tube has conically tapered ends which are mounted between complementary conical surfaces of annularly shaped electrodes arranged coaxially with the graphite tube, and in which the electrodes on the side away from the graphite tube and beyond said conical surfaces have inner surfaces expanding again from a most restricted cross-section, the improvement comprising: that said further holes are constituted by bores (27) which extend from front faces (26) of the electrodes (4,5) on the side facing the graphite tube and terminate in said expanding inner surfaces (23).

3. A heated sample cell assembly as claimed in claim 2, in which: the front faces of the electrodes (4,5) on the side facing the graphite tube are radially extending annular surfaces (26) perpendicular to the axis of the electrodes (4,5), which follow and terminate the said conical surfaces (6,7).

4. A heated sample cell as claimed in claim 1, in which: each of the expanding inner surfaces (23) of the electrodes (4,5) has a respective conical portion (24) following the most restricted narrowest cross-section

(22) and a respective cylindrical portion (25) following the conical portion.

5. A heated sample cell as claimed in claim 4, in which: the taper angle of the conical portions (24) of said expanding inner surfaces (23) are greater than the taper angle of the conical surfaces (6,7) accommodating the ends of the graphite tube (1).

6. A heated sample cell as claimed in claim 4, in which: said bores (27) terminate in the conical portions (24) of the expanding inner surfaces (23) of the electrodes (4,5).

7. A heated sample cell as claimed in claim 2, in which: the outer surfaces of the electrodes (4,5) are slightly tapering outwardly.

* * * * *